(12) United States Patent
Turnbull et al.

(10) Patent No.: US 7,120,261 B1
(45) Date of Patent: Oct. 10, 2006

(54) VEHICLE ACCESSORY MICROPHONE

(75) Inventors: Robert R. Turnbull, Holland, MI (US); Robert C. Knapp, Coloma, MI (US); Alan R. Watson, Buchanan, MI (US); G. Bruce Poe, Hamilton, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/444,176

(22) Filed: Nov. 19, 1999

(51) Int. Cl.
H04B 1/00 (2006.01)
H04R 3/00 (2006.01)
H04R 11/04 (2006.01)

(52) U.S. Cl. .......... 381/86; 381/92; 381/355; 381/357; 381/359

(58) Field of Classification Search ............. 381/94.1, 381/94.7, 57–58, 122, 93, 66, 86, 92, 365, 381/91, 355–359, 361, 369, 182
See application file for complete search history.

(56) References Cited

U.S. PATENT DOCUMENTS

| | | | |
|---|---|---|---|
| 2,921,993 A | 1/1960 | Beaverson | |
| 3,777,079 A | 12/1973 | Fischer et al. | |
| 3,963,881 A | 6/1976 | Fraim et al. | |
| 3,995,124 A * | 11/1976 | Gabr | 381/357 |
| 4,182,937 A | 1/1980 | Greenwood | |
| 4,264,790 A | 4/1981 | Zlevor | |
| 4,354,059 A | 10/1982 | Ishigaki et al. | |
| 4,362,907 A | 12/1982 | Polacsek | |
| 4,570,746 A | 2/1986 | Das et al. | |
| 4,600,077 A | 7/1986 | Drever | |
| 4,625,827 A | 12/1986 | Bartlett | |
| 4,672,674 A | 6/1987 | Clough et al. | |
| 4,675,906 A * | 6/1987 | Sessler et al. | 381/92 |
| 4,712,429 A | 12/1987 | Raspet et al. | |
| 4,737,976 A | 4/1988 | Borth et al. | |
| 4,742,548 A * | 5/1988 | Sessler et al. | 381/92 |
| 4,888,807 A | 12/1989 | Reichel | |
| 4,975,966 A | 12/1990 | Sapiejewski | |
| 5,185,803 A | 2/1993 | Moyski et al. | |
| 5,193,117 A | 3/1993 | Ono et al. | |
| 5,212,764 A | 5/1993 | Ariyoshi | |
| 5,268,965 A * | 12/1993 | Badie et al. | 381/364 |
| 5,323,466 A | 6/1994 | Geddes | |
| 5,335,282 A * | 8/1994 | Cardas | 381/92 |
| 5,349,140 A | 9/1994 | Valenzin | |
| 5,353,376 A | 10/1994 | Oh et al. | |
| 5,365,595 A | 11/1994 | Li | |
| 5,410,604 A | 4/1995 | Saito et al. | |
| 5,414,776 A | 5/1995 | Sims, Jr. | |

(Continued)

FOREIGN PATENT DOCUMENTS

DE 104891 A1 3/1974

(Continued)

OTHER PUBLICATIONS

Patent Abstract for European Patent No. 624046, Nov. 9, 1994.

(Continued)

*Primary Examiner*—Laura A. Grier
(74) *Attorney, Agent, or Firm*—Price, Heneveld, Cooper, DeWitt & Litton, LLP (57) ABSTRACT

A microphone assembly includes at one or more transducers positioned in a housing. Circuitry is coupled to the transducer for outputting an electrical signal such that the microphone has a main lobe directed forwardly and attenuates signals originating from the sides. The microphone transducers can advantageously include multiple transducers which with the circuit produce a desired sensitivity pattern. The microphone can be employed in a vehicle accessory.

15 Claims, 6 Drawing Sheets

U.S. PATENT DOCUMENTS

| | | | |
|---|---|---|---|
| 5,426,703 A | 6/1995 | Hamabe et al. | |
| 5,442,813 A | 8/1995 | Walters | |
| 5,459,702 A | 10/1995 | Greenspan | |
| 5,546,458 A | 8/1996 | Iwami | |
| 5,566,224 A | 10/1996 | ul Azam et al. | |
| 5,631,638 A | 5/1997 | Kaspar et al. | |
| 5,732,143 A | 3/1998 | Andrea et al. | |
| 5,754,665 A * | 5/1998 | Hosoi | 381/92 |
| 5,796,819 A | 8/1998 | Romesburg | |
| 5,812,496 A | 9/1998 | Peck | |
| 5,825,897 A | 10/1998 | Andrea et al. | |
| 5,835,607 A * | 11/1998 | Martin et al. | 381/92 |
| 5,835,608 A | 11/1998 | Warnaka et al. | |
| 5,854,848 A | 12/1998 | Tate et al. | |
| 5,862,240 A | 1/1999 | Ohkubo et al. | |
| 5,878,353 A | 3/1999 | ul Azam et al. | |
| 5,898,392 A | 4/1999 | Bambini et al. | |
| 5,917,921 A * | 6/1999 | Sasaki et al. | 381/94 |
| 5,969,838 A | 10/1999 | Paritsky et al. | |
| 6,028,537 A | 2/2000 | Suman et al. | |
| 6,061,457 A | 5/2000 | Stockhamer | |
| 6,089,721 A | 7/2000 | Schierbeek | |
| 6,091,830 A * | 7/2000 | Toki | 381/359 |
| 6,118,881 A | 9/2000 | Quinlan et al. | |
| 6,127,919 A | 10/2000 | Wylin | |
| 6,154,554 A | 11/2000 | Kondo | |
| 6,246,765 B1 | 6/2001 | Palett et al. | |
| 6,278,377 B1 | 8/2001 | DeLine et al. | |
| 6,356,641 B1 | 3/2002 | Warnaka et al. | |
| 6,433,676 B1 | 8/2002 | DeLine et al. | |
| 6,466,136 B1 * | 10/2002 | DeLine et al. | 340/815.4 |
| 6,505,087 B1 | 1/2003 | Lucas et al. | |

FOREIGN PATENT DOCUMENTS

| | | |
|---|---|---|
| EP | 0411360 | 7/1990 |
| EP | 0624046 | 4/1994 |
| EP | 0846598 | 12/1997 |
| EP | 1078818 | 2/2001 |
| GB | 2327012 | 1/1999 |
| JP | 5689194 | 7/1981 |
| JP | 56116396 | 9/1981 |
| JP | 59149494 | 8/1984 |
| JP | 62281596 | 12/1987 |
| JP | 62281597 | 12/1987 |
| JP | 1114245 | 5/1989 |
| JP | 2-21997 | 2/1990 |
| JP | 3-231044 | 10/1991 |
| JP | 5-66783 | 3/1993 |
| JP | 5207117 | 8/1993 |
| JP | 7-39152 | 7/1995 |
| JP | 10107880 | 4/1998 |
| JP | 11-65587 | 3/1999 |
| JP | 11352987 | 12/1999 |
| JP | 01352595 | 12/2001 |
| WO | 9858450 | 12/1998 |
| WO | 9966638 | 12/1999 |
| WO | 9966647 | 12/1999 |
| WO | 0052639 | 9/2000 |

OTHER PUBLICATIONS

Patent Abstract for European Patent No. 411360, Feb. 6, 1991.

Patent Abstract for Japanese Publication No. 05066783, Mar. 19, 1993.

Patent Abstract for Japanese Publication No. 11065587, Mar. 9, 1999.

Patent Abstract for Japanese Publication No. 11352987, Dec. 24, 1999.

Patent Abstract for Japanese Publication No. 01114245, May 2, 1989.

Patent Abstract for Japanese Publication No. 07250144, Sep. 26, 1995.

Patent Abstract for Japanese Publication No. 05162590, Jun. 29, 1993.

Olson, Harry F., "Accoustical Engineering," D. Van Nostrand Company, Inc., 1957.

Robertson, A.E., "Microphones," New York Hayden Book Co., Inc., 1951.

* cited by examiner

VEHICLE ACCESSORY MICROPHONE

FIELD OF THE INVENTION

The present invention pertains to microphones, and more particularly to a microphone associated with a vehicle accessory such as a rearview mirror assembly.

BACKGROUND OF THE INVENTION

It has long been desired to provide improved microphone performance in hands-free communication devices that operate under a variety of different ambient noise conditions. Communication devices supporting hands-free operation permit the user to communicate through a microphone of a device that is not held by the user. Because of the distance between the user and the microphone, these microphones often detect undesirable noise in addition to the user's speech. The noise is difficult to attenuate. A particularly challenging hands-free application where dynamically varying ambient noise is present is a hands-free communication system for a vehicle. For example, bi-directional communication systems such as two-way radios, cellular telephones, satellite phones, and the like, are used in vehicles, such as automobiles, trains, airplanes and boats. For a variety of reasons, it is preferable for the communication devices of these systems to operate hands-free, such that the user need not hold the device while talking, even in the presence of high ambient noise levels subject to wide dynamic fluctuations.

Bi-directional communication systems include an audio speaker and a microphone. In order to improve hands-free performance in a vehicle communication system, a microphone is typically mounted near the driver's head. For example, a microphone is commonly attached to the vehicle visor or headliner using a fastener such as a clip, adhesive, hook and loop fastening tape (such as VELCRO® brand fastener), or the like. The audio speaker associated with the communication system is preferably positioned remote from the microphone to assist in minimizing feedback from the audio speaker to the microphone. It is common, for example, for the audio speaker to be located in a vehicle adaptor, such as a hang-up cup or a cigarette lighter plug used to provide energizing power from the vehicle electrical system to the communication device. Thus, although the communication system designer knows the position of the audio speaker in advance, the position of the microphone is unknown as the user can position the microphone where they choose. The position of the microphone relative to the person speaking will determine the level of the speech signal output by the microphone and may affect the signal-to-noise. The position of the microphone relative to the audio speaker will impact on feedback between the speaker and microphone. Accordingly, the performance of the audio system is subject to the user's installation of the microphone. Additionally, the microphone will typically include a wire, which if it is mounted to the surface of the vehicle interior, will not be aesthetically pleasing. Alternatively, if the wire is to be mounted behind the interior lining, the vehicle interior must be disassembled and then reattached so that the wire can be hidden, which may result in parts that rattle loudly or hang loosely from the vehicle frame.

One proposed solution to avoid these difficulties is disclosed in U.S. Pat. No. 4,930,742, entitled "REARVIEW MIRROR AND ACCESSORY MOUNT FOR VEHICLES", issued to Schofield et al. on Jun. 5, 1990, which uses a microphone in a mirror mounting support. Although locating the microphone in the mirror support provides the system designer with a microphone location that is known in advance, and avoids the problems associated with mounting the microphone after the vehicle is manufactured, there are a number of disadvantages to such an arrangement. Because the mirror is positioned between the microphone and the person speaking into the microphone, a direct unobstructed path from the user to the microphone is precluded. Additionally, the location of the microphone on the windshield detrimentally impacts on microphone design flexibility and overall noise performance of the microphone.

It is highly desirable to provide voice recognition systems in association with vehicle communication systems, and most preferably such a system would enable hands-free operation. Hands-free operation of a device used in a voice recognition system is a particularly challenging application for microphones, as the accuracy of a voice recognition system is dependent upon the quality of the electrical signal representing the user's speech. Conventional hands-free microphones are not able to provide the consistency and predictability of microphone performance needed for such an application in a controlled environment such as an office, let alone in an uncontrolled environment such as an automobile.

Accordingly, there is a need for a microphone for a vehicle providing improved hands-free performance and preferably enabling voice recognition operation.

BRIEF DESCRIPTION OF THE DRAWINGS

The subject matter that is regarded as the invention is particularly pointed out and distinctly claimed in the claim portion that concludes the specification. The invention, together with further objects and advantages thereof, may best be understood by reference to the following description taken in conjunction with the accompanying drawings, where like numerals represent like components, and in which:

DETAILED DESCRIPTION OF THE INVENTION

The microphone assemblies of the present invention are generally associated with an interior rearview mirror and have superior performance even in the presence of noise. The microphone assemblies enhance the performance of hands-free devices with which they are associated, including highly sensitive applications such as voice recognition for a telecommunication system, by improving the signal-to-noise ratio of the microphone assembly output. The microphone assemblies eliminate mechanically induced noise and provides the designer with significant freedom with respect to selection of the microphone assembly's sensitivity, frequency response and polar pattern. Additionally, circuitry can be provided for the transducer to generate an audio signal from the transducer output that has a high signal-to-noise ratio.

Figure 1:
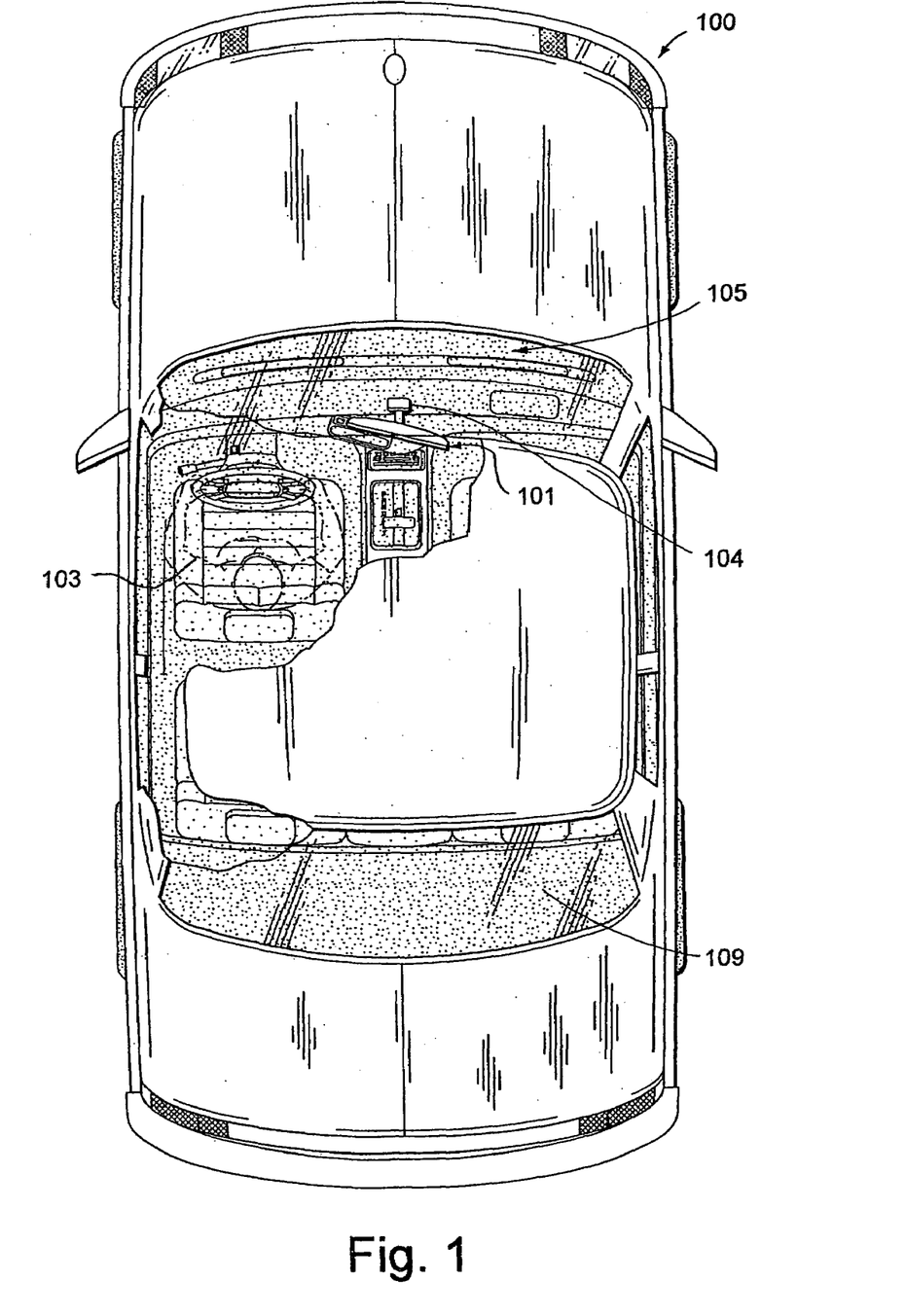
FIG. 1 is a top plan view illustrating a vehicle with a portion of the roof cut away.

A vehicle 100 (FIG. 1) includes an interior rearview mirror assembly 101 by which the vehicle operator 103 (illustrated in phantom) can view a portion of the road behind the vehicle 100 without having to turn around. The rearview mirror assembly 101 is mounted to the vehicle windshield 105, or the vehicle's headliner, via a mirror mounting support 104, in a conventional manner that facilitates electrical connection of the rearview mirror to the vehicle's electrical system and permits driver adjustment of the mirror-viewing angle.

Figure 2:
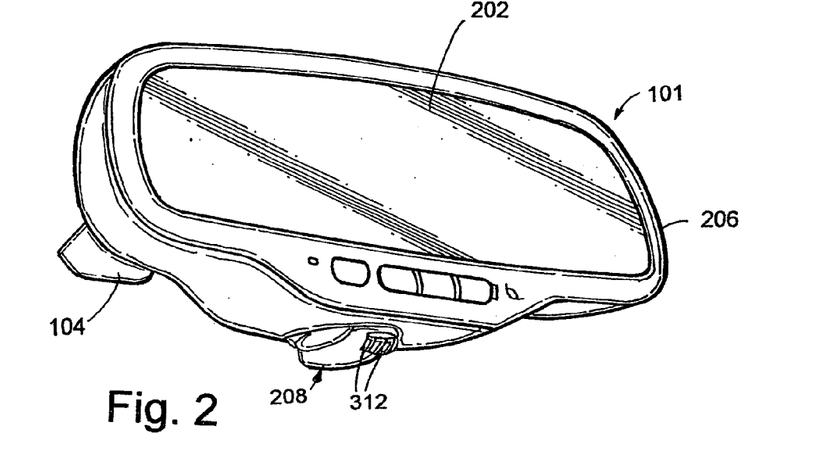
FIG. 2 is a front, bottom and left side perspective view illustrating a rearview mirror assembly and fragmentary mirror support used in the vehicle of FIG. 1.
Figure 3:
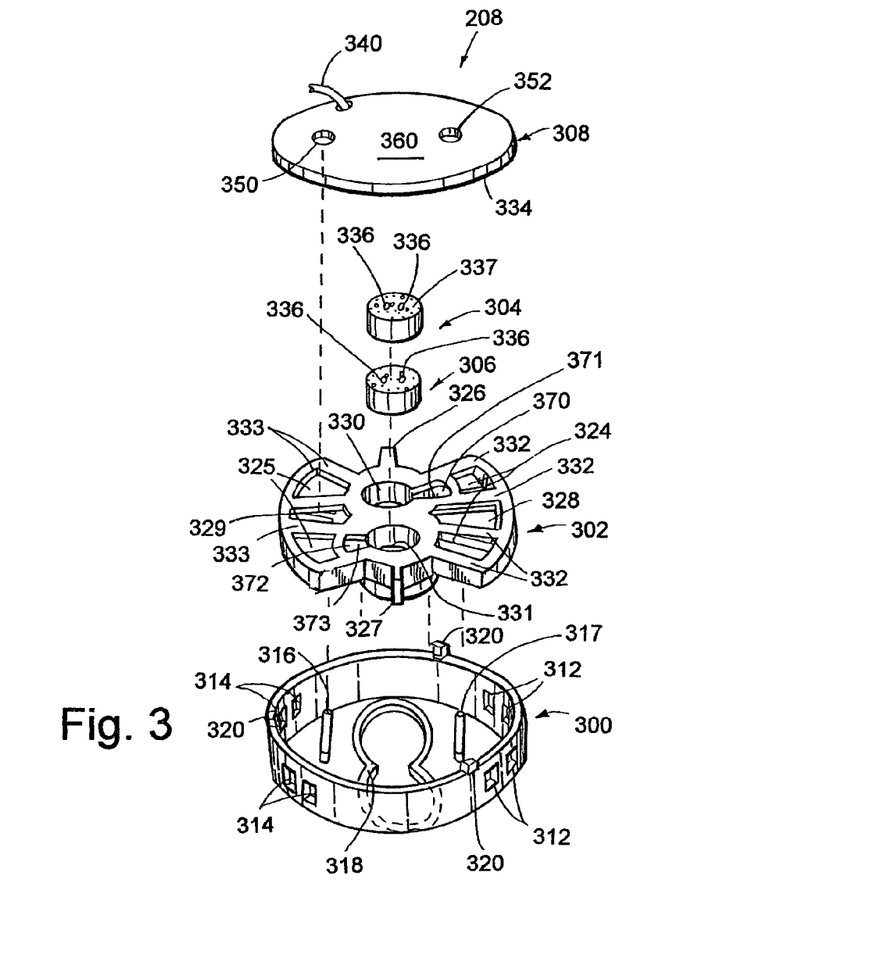
FIG. 3 is a top exploded view illustrating a microphone assembly used in the mirror according to FIG. 2.
Figure 4:
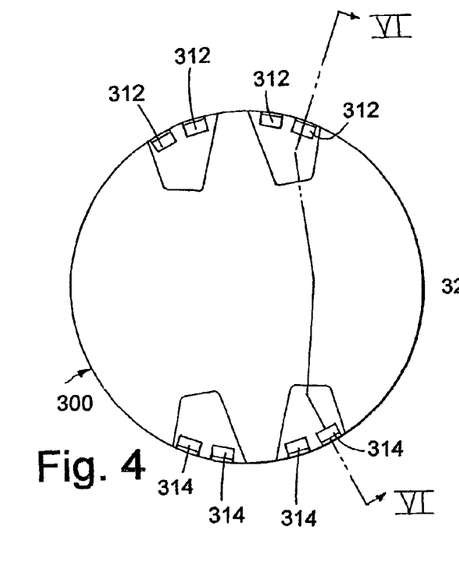
FIG. 4 is a bottom plan view illustrating the microphone assembly according to FIG. 2.

The rearview mirror assembly 101 is enlarged in FIG. 2. The mirror assembly 101 includes an elongated housing 206 pivotably carried on mirror support 104. The mirror 202 may be any conventional interior rearview mirror, such as a prismatic mirror of the type used with a mirror housing manually adjustable for daytime and nighttime operation, or a multiple element mirror effecting automatic reflectivity adjustment, such as an electrooptic or electrochromic mirror. The elongated housing 206 may be of any conventional manufacture such as integrally molded plastic.

The rearview mirror assembly 101 further includes a microphone assembly 208 that is preferably mounted to the housing 206 at a location visible to the vehicle driver 103 or at a position which is direct line of sight between the speaker's mouth and the microphone. It is advantageous for the microphone assembly 208 to be positioned on the mirror housing 206 as the mirror assembly is movably carried on the support 104. The driver 103 (FIG. 1) will typically adjust the position of the mirror 202 and housing 206 to reflect images visible through the rear window 109 of the vehicle 100. When making such an adjustment for viewing angle, the driver 103 adjusts the mirror 202 towards his or her eyes by moving housing 206 which will simultaneously direct the front of microphone assembly 208 toward the driver. However, the microphone assembly could be mounted in other vehicle accessories, such as a visor, an overhead console, a vehicle trim component such as a headliner or an A-pillar cover, a center console, or the like.

The microphone assembly 208 will now be described in greater detail with respect to FIGS. 3–7. The microphone assembly includes a microphone housing 300, a transducer mount 302, a first transducer 304, a second transducer 306, and a circuit board 308. The microphone housing 300 (FIGS. 3 and 4) is generally cylindrical, having a round foot print and a low profile, although the housing could have a generally square foot print, an elongated elliptical or rectangular foot print, or any other shape desired by the microphone designer. The microphone housing 300 includes front ports 312 that face the driver 103 and rear ports 314 that face away from the driver 103. The ports 312 and 314 provide a sound passage through the microphone housing. The ports 312, 314 can have any suitable opening shape. The housing also includes posts 316, 317 used to hold the microphone assembly 208 together, as described in greater detail herein below. A rail 318 on the inside surface of housing 300 is shaped to receive a portion of mount 302. When received in the rail, the mount is positioned with the transducer 304 and 306 sound channels properly aligned with the ports 312, 314. The housing also includes mounting tabs 320 for insertion into openings (not shown) in the lower surface of housing 206. For example, the tabs can be generally L-shaped in profile for insertion into the housing 300. After tabs 320 are inserted into housing 206, the microphone housing 300 is locked to the mirror housing 206 by rotating the microphone to a locked position, thereby securing the microphone assembly 208 on the housing assembly 101. Alternately, the tabs 320 can be elongate snap connectors that slide into an opening (not shown) in the bottom surface of the mirror housing and snap into engagement with the inside surface of the mirror housing 206 after full insertion. The microphone housing 300 can be integrally molded plastic, stamped metal, or of any other suitable manufacture.

The transducer mount 302 is configured such that it is pressed into the housing 300 and is slightly compressed between circuit board 308 and housing 300. The transducer mount provides acoustic seals for the transducers 304 and 306, and with the circuit board 308 and housing 300, defines acoustic channels, or sound passages, to the front and rear faces of the transducers 304, 306, as described in greater detail below. The mount 302 includes webs 324 between walls 332 and webs 325 between walls 333 that extend outwardly from the core of mount 302 to provide sound passages, and also help to position the mount in the housing 300. Projections 326, 327 are located on opposite ends of the mount to help position the mount 302 in housing 300. Openings 328, 329 are provided in the webbing 324, 325 of mount 302 for passage of posts 316, 317. Cylindrical wells 330, 331 are provided in the core of transducer mount 302 for receipt of transducers 304, 306, respectively. Each of the wells 330, 331 includes a terminating wall 501 (FIG. 5) against which the front faces 500 of the transducers 304, 306 sit. The terminating walls 501 each include a channel 506, 508 that extends radially outward from the center of the well, which is the location of the front transducer aperture. The mount 302 can be of any suitable manufacture, such as a molded elastomer. In particular the mount 302 is resilient and non-conductive, and provides acoustic isolation. For example, the transducer mount 302 can be manufactured of urethane commercially available from Mobay.

The transducers 304 and 306 are preferably substantially identical. The transducers include a front aperture 502 which passes sound to the front surface of a transducer diaghram and openings 337 (FIG. 3) in the back face that port sound to the back surface of the transducer diaghram. The transducers include electrical leads 336 on the back face thereof for electrical connection to the conductive layer of circuit board 208. The transducers 304 and 306 can be any suitable, conventional transducers, such as electret, piezoelectric, or condenser transducers. The transducers may be, for example, electret transducers such as those commercially available from Matsushita of America (doing business as Panasonic), and may advantageously be unidirectional transducers. If electret transducers are employed, the transducers can be suitably conditioned to better maintain transducer performance over the life of the microphone assembly 208. For example, the diaghrams of the transducers 304, 306 can be baked prior to assembly into the transducers.

The circuit board 308 has a conductive layer, on surface 334, electrically connected to the transducer leads 336 of transducers 304, 306. The microphone leads 340 are connected to the transducer leads 336 by a circuit 800 (FIG. 8) mounted to the conductive layer of circuit board 308. Although circuit 800 can be mounted on the circuit board 308 in the microphone housing, it will be recognized that the circuit 800 can alternatively be mounted on a printed circuit board in the mirror housing 206, and further that in the case of an electrooptic mirror, such as an electrochromic mirror, the circuit 800 can be mounted on a common circuit board with the mirror electrical components, or the circuit 800 and the mirror electrical components can be mounted on separate circuit boards within the housing 206. The electrical connection of the microphone leads 340, the transducer leads 336, and the components of circuit 800, are preferably by electrical traces in the conductive layer of the circuit board, formed by conventional means such as etching, and vias extending through the dielectric substrate of the printed circuit board. The circuit board includes holes 350 and 352 for receipt of posts 316 and 317 on microphone housing 300. The posts 316, 317 are heat staked to the circuit board substrate after the posts are inserted through holes 350 and 352 to secure the connection of the circuit board to the housing 300 and insure that the microphone assembly provides acoustically isolated sound channels between the transducers 304, 306 and the ports 312, 314, as described in greater detail herein below.

To assemble the microphone assembly 208, the transducers 306 and 308 are mounted on the circuit board 308 by conventional means, such as by soldering transducer leads 336 to the conductive layer 334 of circuit board 308. It is envisioned that the transducer leads can alternatively be elongated posts that extend through vias in the printed circuit board, that the surface 360 can be a conductive layer, and that the components of circuit 800 can be located on surface 360 of the printed circuit board, connected between the transducer leads 336 and the microphone leads 340. Regardless of how the transducers 304 an 306 are mounted on the circuit board 308, the circuit board mounted transducers are pressed into the cylindrical wells 330, 331 in the mount 302. When fully inserted in the wells, the front faces 500 (FIG. 5) of the transducers 304, 306, are positioned against the terminating wall 501 of the wells 330, 331. The wall 501 of each of the wells 330, 331 includes a channel 506, 508 aligned with the openings 502 in the front face of the transducers 304, 306.

Figures 6, 7:
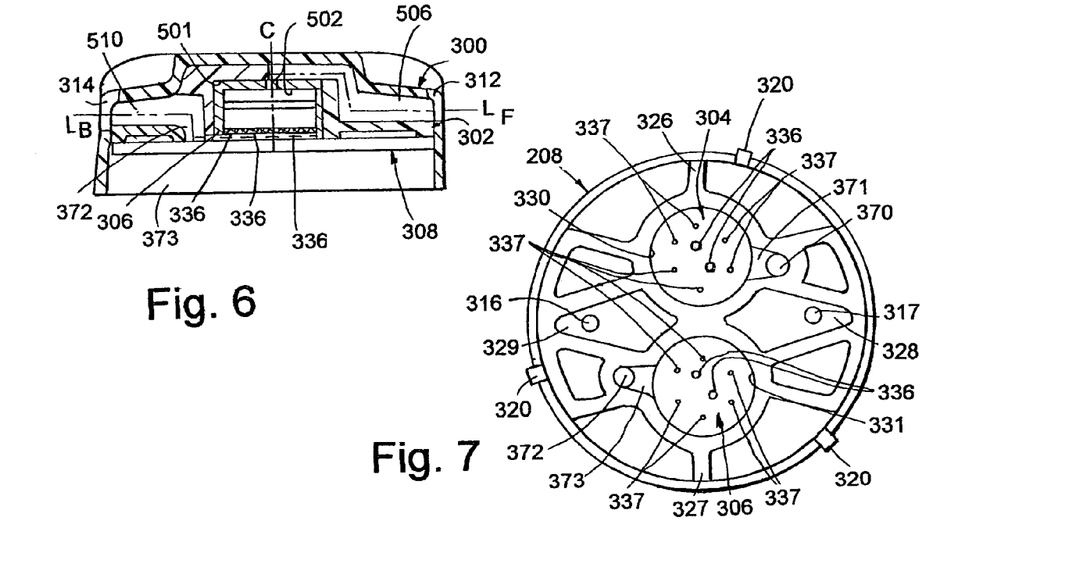
FIG. 6 is cross-sectional view taken along plane 6–6 in FIG. 4 illustrating the microphone assembly according to FIG. 3.
FIG. 7 is a top plan view illustrating the microphone assembly according to FIG. 5 with the circuit board removed to view show the transducers in transducer mount.

The partial assembly comprising mount 302, transducers 304, 306 and circuit board 308, is pressed into the housing 300. FIG. 7 illustrates the microphone assembly 208 with the printed circuit board 308 removed. The back surfaces of the transducers 304, 306, having multiple openings 337 and transducer leads 336, are visible from the open end of the cylindrical wells 330, 331. When the transducers 304, 306 are fully inserted in the well, such that the front face 500 of the transducers are juxtaposed with the wall 501 terminating the well, a chamber is formed between the back surface of each of the transducers 304, 306 and the circuit board 308, as best seen in FIG. 6. A wall of the mount circumscribes the periphery of the transducer 306, 307, and a short channel 371, 373 extends from the well 330, 331 to the aperture 370, 372. The circumscribing wall provides an acoustic seal with the circuit board 308. Apertures 370, 372 connect the chamber, between each of the transducers 304, 306 and the circuit board 308, with the channels 510, 512, respectively. The chamber behind each of the transducers provides a sound passage from the back openings 337 of the transducers through channels 371, 373, 510, and 512 and ports 312, 314. When the mount 302 is fully inserted in the housing 300, the sound passages extending from the front face of each of the transducers to ports 312 and 314 are defined by the housing 300 and the mount 302. The sound passages extending from the back face of each of the transducers to ports 312 and 314 are defined by the housing 300, mount 302 and circuit board 308.

Figure 5:
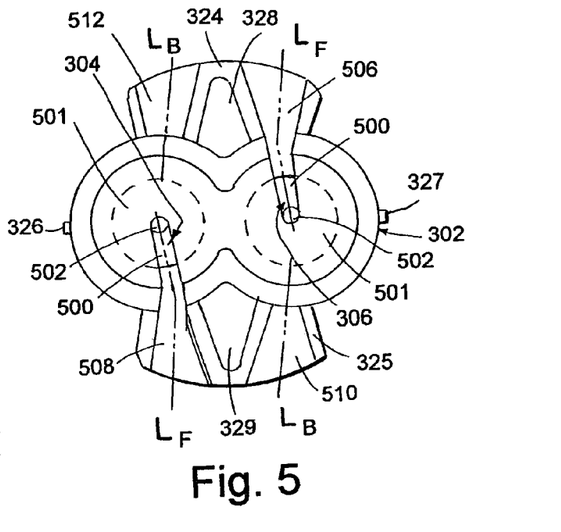
FIG. 5 is a bottom plan view illustrating a transducer mount in the microphone assembly according to FIG. 3.

In particular, the front opening 502 of transducer 306 is connected to the front ports 312 of the microphone housing 300 via the sound passage 506 as best seen in FIG. 6. The rear face openings 337 of the transducer 306 is acoustically coupled to the rear ports 314 via sound channel 373, aperture 372 and channel 510. Transducer 304 is coupled to the front ports 312 and the rear ports 314 in the same manner, but in the opposite phase. In particular, the front face of transducer 304 is acoustically coupled to the rear ports 314 via acoustic channel 508 (FIG. 5). The rear face openings 337 of the transducer 304 are acoustically coupled to the front ports 312 via channel 371, aperture 370, and channel 512. Signals originating from the front of the microphone assembly, which is the surface of the microphone assembly facing the driver, enter the front of transducer 306 and the back of transducer 304, whereas sound originating from the rear of the microphone assembly enter the front face of transducer 304 and the back face of transducer 306. Omni-directional sounds will be detected equally by the transducers, at opposite phases.

As illustrated in FIG. 6, the center axes C of the transducers 304, 306 are oriented at an angle of 90 degrees with respect to the longitudinal axes $L_B$ and $L_F$ of the channels 506, 508, 510, 512. Thus the acoustic outputs from the two transducers lie on a common axis facing in opposite directions and perpendicular to the center axis C of the transducers.

The transducers 304 and 306 are electrically coupled to an operational amplifier 802 (FIG. 8) of circuit 800. In particular, transducer 306 is coupled to the inverting input of the operational amplifier 802 and transducer 304 is coupled to the non-inverting input of the operational amplifier. Resistor R8, connected between the transducer 306 and the inverting input of the operational amplifier 802, is preferably a potentiometer to permit manual balancing of the transducers. Alternatively, the resistor R12 connected between transducer 304 and the non-inverting input of the operational amplifier, or both resistors R10 and R12, can be implemented by potentiometers. It is also envisioned that a variable gain amplifier with an associated manually adjustable potentiometer can be inserted in one or both of the paths between transducers 304, 306 and operational amplifier 802. The operational amplifier may be implemented using any suitable operational amplifier, such as the TLC271 operational amplifier available from Texas Instruments. The manually adjustable potentiometer R8 is provided for varying the gain of the transducer path to permit adjustment of the signal level from transducer 306 such that both transducer 304, 306 paths produce the same signal gain (i.e., the signal gain through both transducers is equal). By providing identical gain through both transducers, omni-directional noise detected by both transducers will be completely cancelled at the output of the operational amplifier 802. Acoustic signals generated by the vehicle driver, such as the driver's speech, will be input to the front of transducer 306 and the back of transducer 304, such that the speech will be present in the audio signal at the output of operational amplifier 302. Sound from the sides of the microphone assembly will be cancelled by the transducers 304, 306 and the operational amplifier 802. The most intense noise in a vehicle tends to originate from the sides of the vehicle. The microphone assembly 208 mounted on the rearview mirror 206, including amplifier 802, will significantly reduce noise as the bi-directional microphone assembly is not responsive to noise originating from the sides of the vehicle when mounted in the mirror assembly 101 which is generally aligned with the longitudinal axis of the vehicle. Furthermore, mechanical noise, such as that originating in the rearview mirror assembly 101, will be detected by both transducers 304, 306 equally, and thus will be cancelled out by the operational amplifier 802.

Figure 8:
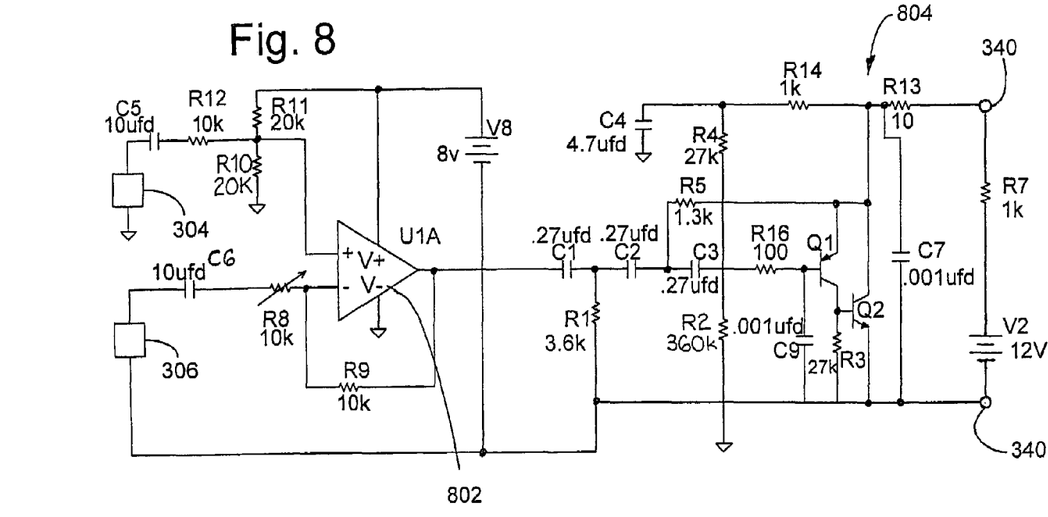
FIG. 8 is a circuit schematic partially in block diagram form illustrating a circuit employed with the microphone assembly of FIGS. 3–7.

The output of the operational amplifier 802 is input to a 3-pole high pass filter and unity gain follower 804, having a cut-off at approximately 100–300 Hz, and preferably at 150 Hz. The filter removes noise below the voice frequency. Terminals 340 are coupled to the vehicle's electrical circuitry, which may for example include voice recognition circuitry, a cellular transceiver, a two-way radio, or any other control circuitry. The transistors Q1 and Q2 can be implemented using any suitable commercially available transistor elements, such as FFB2227 commercially available from Fairchild Semiconductor.

In summary, the bi-directional microphone assembly 208 is very responsive to voice signals from the driver 103 located in front of the mirror assembly 101, as signals from the front of the mirror will sum in operational amplifier 802. As a consequence, on-axis sound will experience a gain and the microphone assembly will have a high signal-to-noise ratio. It is envisioned that a gain of approximately 6 dB can be achieved by bi-directional microphone assembly 208. The microphone is highly directional, such that off-axis sound is attenuated, and even nulled, by the microphone. Further, the bi-directional microphone assembly 208 can employ any type of directional transducer, so long as identical transducers are employed.

Figures 9, 10:
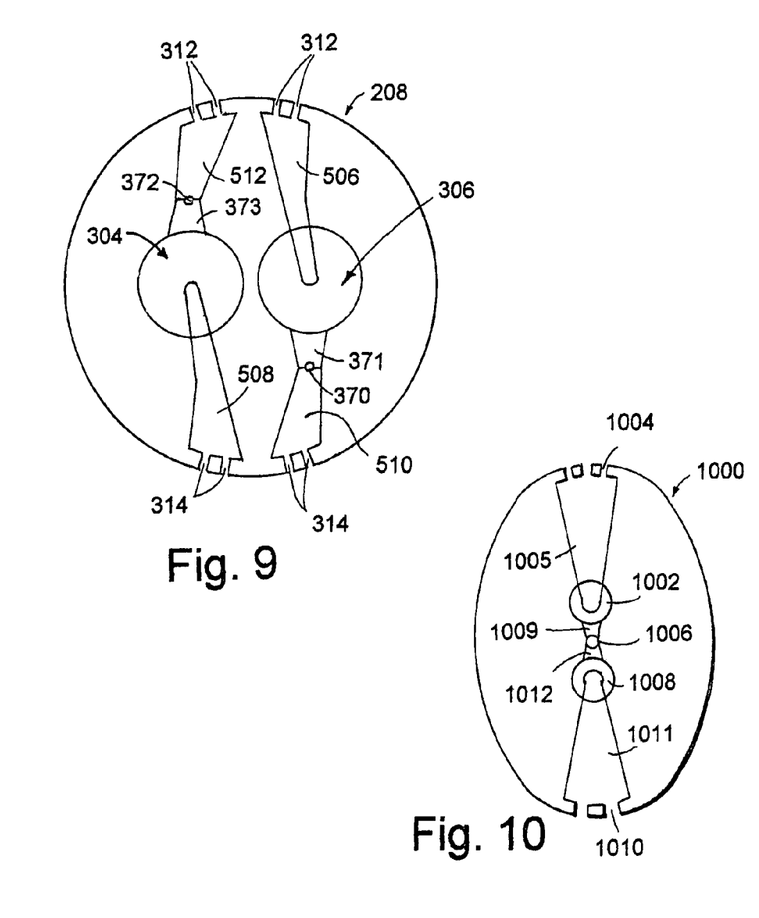
FIG. 9 is a top plan view schematic representation illustrating the sound channel for the transducers of the microphone assembly according to FIGS. 1–7.
FIG. 10 is a top plan view schematic representation illustrating the sound channel for an alternate transducer arrangement for the microphone assembly.
Figure 11:
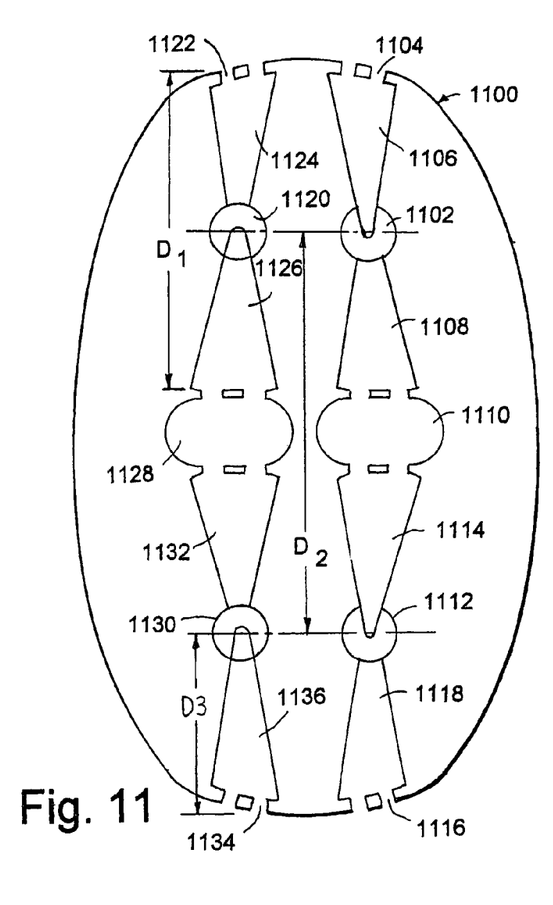
FIG. 11 is a top plan view schematic representation illustrating the sound channel for another alternate transducer arrangement for the microphone assembly.

The bi-directional microphone assembly 208 is schematically illustrated in FIG. 9, and alternate embodiments are schematically illustrated in FIGS. 10 and 11. As described above, the bi-directional microphone assembly 208 includes transducer 306, having its front face opening ported to the front ports 312 through channel 506 and its back face openings ported to the back ports 314 through channels 370, 371 and 510, and transducer 304, having its front face ported to the rear ports 314 through channel 508 and its rear face ported to the front port 312 through channels 372, 373 and 512. The bi-directional microphone assembly 208 thus has transducers mounted on the same lateral axis, but at opposite phases. An alternative to the bi-directional microphone assembly 208, is the hyper cardioid microphone assembly 1000 illustrated in FIG. 10. The hyper cardioid microphone assembly 1000 includes a front transducer 1002 having its front face acoustically coupled to port 1004 through channel 1005 and its back face acoustically coupled to port 1006 through channel 1009. The front face of a rear transducer 1008 is acoustically coupled to ports 1010 through channel 1011 and the rear face of transducer 1008 is acoustically coupled to port 1006 through channel 1012. The transducers are electrically coupled to an operational amplifier in the same manner that the transducers 304 and 306 are electrically coupled to operational amplifier 802. However, unlike bi-directional microphone assembly 208, for which identical transducers are selected, the transducers 1002 and 1008, and the variable gain balance circuit 802, are selected and operated such that the front transducer 1002 produces a greater sensitivity than the back transducer 1008 while maintaining a null of the vibration created signals.

The microphone assembly 1000 may be advantageous in applications wherein the noise incident on the microphone assembly is generally random and omni directional, or in an environment where the front lobe of the microphone needs to be larger to accommodate off-axis noise sources. Microphone assembly 1000 will be better suited for use in vehicles where the person speaking, such as the driver, is not positioned in front of the rearview mirror assembly, because the bi-directional microphone 208 may attenuate the speech from the person speaking. As noted above, the most intense noise in a vehicle originates from the side of the vehicle, which the bi-directional microphone assembly 208 mounted to the mirror assembly 101 will better reject than the hyper cardioid microphone assembly 1000. Another problematic environmental condition better resolved by the bi-directional microphone assembly 208 than the hyper cardioid microphone assembly 1000, is small room reverberation effect. Reverberation causes noise, with a wavelength long relative to room dimensions, such that it is omni-directional. Microphone assembly 208, having two identical transducers will effectively null omni-directional components, such that all the reverberating noise will be cancelled. The hyper cardioid microphone assembly 1000 will not completely cancel such reverberation noise, due to the differential on-axis sensitivity for the front and rear transducers 1002, 1008.

Whereas bi-directional microphone assembly 208 requires matched transducers such that the noise is cancelled, the hyper cardioid requires transducers producing different on-axis sensitivity. In particular, the transducer sensitivity differential for transducers 1002 and 1008 needs to be 5 to 15 dB, and may for example be 10 dB. The transducer control and damping values, which should be considered for the hyper cardioid microphone assembly 1000, will not be important for the bi-directional polar microphone assembly 208 so long as the transducers are the same. So long as identical transducers are provided, the out of phase and the omni-directional contents, such as mechanical vibration, reverberations, sound having a frequency such that it is non-directional, will null, in microphone assembly 208. The hyper cardioid microphone assembly 1000 requires two different sensitivities from the front and back transducers 1002 and 1008. The transducers must be carefully selected to have the desired sensitivity differential. Microphone assembly 1000 preferably uses higher quality transducers for the front and back transducers 1002, 1008, so that the desired performance can be achieved and sustained, than need be used for the bi-directional microphone assembly 208.

A second order microphone assembly 1100 according to another alternate embodiment is disclosed in FIG. 11. The microphone assembly 1100 includes transducers 1102 and 1112. The front face of transducer 1102 is coupled to a port

1104 through an acoustic channel 1106. The rear face of transducer 1102 is acoustically coupled to port 1110 through channel 1108. The front face of rear transducer 1112 is coupled to port 1110 through channel 1114. The rear face of transducer 1112 is coupled to port 1116 through channel 1118.

Figure 12:
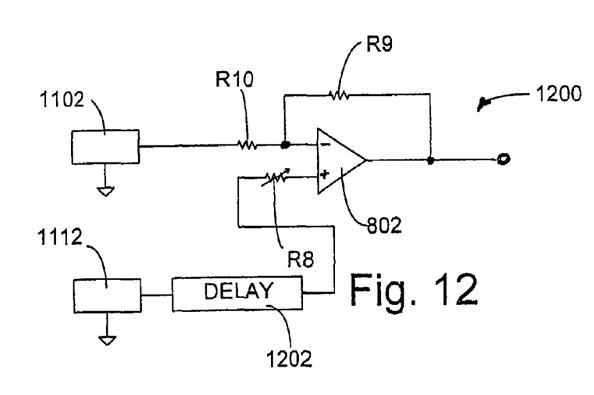
FIG. 12 is a circuit schematic partially in block diagram form illustrating a circuit for use with the microphone according to claim 11.

The transducers 1102 and 1112 are electrically coupled to a circuit 1200 (FIG. 12). The sound from the front transducer 1102 is input to the non-inverting input of an operational amplifier 802. The signal from transducer 1112 is input to a time delay circuit 1202 prior to being input to the amplifier 802. The time delay circuit 1202 introduces a time delay equal to the time period required for sound to travel distance D2, which is the distance from the center of the front transducer 1102 to the center of the rear transducer 1112. The delayed signal is input to the inverting input of operational amplifier 802 through potentiometer R8.

In operation, the signals originating from the front of the microphone assembly 1100 will reach the rear transducer 1112 a short time period after reaching the front transducer 1102. This time delay is equal to the time required for sound to travel from the center of the front transducer 1102 to the center of the rear transducer 1112. Since the signal entering the rear transducer is electronically delayed in time delay circuit 1202 by an amount equal to the time period required for sound to travel distance D2, the rear signal will arrive at the inverting input of the operational amplifier 802 delayed by a time period equal to twice the time required for sound to travel distance D2. Sound originating from the rear, however will reach front transducer 1102 delayed by a time period equal to the the time required for sound to travel distance D2. Because the signal from the rear transducer 1112 signal is delayed electronically, in delay 1202, by a time period equal to the time required for sound to travel distance D2, the signal originating from the rear sensed by both transducers 1102 and 1112 will be input to both the non-inverting and inverting inputs of the operational amplifier 802 at the same time, such that they are cancelled by the amplifier 802. Accordingly, a null is provided for signals originating from the rear of the microphone assembly. It will be recognized that the greater distance D1 and D2 for the second order microphone assembly 1100, the greater the sensitivity of the microphone assembly. Additionally, for every distance D2, there is a crossover frequency above which the difference in phase no longer adds to the output, such that the highest upper frequency desired sets the maximum distance D2. Above the crossover frequency, the microphone will lose its directional properties and suffer frequency response anomalies. It is envisioned that the maximum distance D2 for the second order microphone assembly 1100 will be between 0.75 and 1.4 inches, and may be for example be approximately 1 inch.

One issue with respect to this implementation, is the phase shift that will occur. In particular, the higher the frequency, the greater the phase shift that the signal will experience between the front transducer and the rear transducer. Low frequency signals will experience little phase shift, whereas high frequency signals will experience a large phase shift. Since acoustic sensitivity increases with additional phase shift, low frequency sensitivity will be very low. However, because the signals of interest are voice signals, which are relatively high frequency signals, the signals of interest will not be significantly affected by this phase shift. Additionally, it is envisioned that equalization techniques can be used to compensate for the phase shift and low frequency roll-off in bass sensitivity of the microphone 1100. The front and back transducers 1102 and 1112 achieve a second order directional function by their spacing. Additionally, the two transducers face the same direction, such that the front face of both the front and rear transducers port forwardly and the back of both the front and rear transducers port rearwardly. The transducers 1102 and 1112 are spaced by a distance D2, which is a dimension close to D1 of the front transducer 1102, and may also be a dimension close to the D3 for the rear transducer 1112. The greatest output from the microphone will occur responsive to on-axis sound in front of the microphone assembly 1100, where the arrival delay is doubled.

The vibration null and additional acoustic advantages of microphone 208 can be gained for the microphone assemblies 1000 and 1100 by using four transducers, as illustrated in FIG. 11 for microphone assembly 1100. In particular, optional transducers 1120 and 1130 are provided in addition to transducers 1102 and 1112. The rear face of transducer 1120 is coupled to the front port 1122 via channel 1124 and the front face of transducer 1120 is coupled to port 1128 via channel 1126. The front face of rear transducer 1130 is coupled to rear port 1134 via channel 1136 and the rear of transducer 1130 is coupled to port 1128 via channel 1132. The front transducers 1102 and 1120 are connected to opposite inputs of the operational amplifier without delay so as to cancel omni-directional noise. The rear transducers 1112 and 1130 are similarly connected to opposite inputs of the operational amplifier, after being delayed by the time period required for sound to travel distance D2, so as to cancel omni-directional noise. Using two pairs of transducers, each pair will achieve a bi-directional pattern and be devoid of vibration noise. In particular, nulls will occur at 90, 180, 270 degrees. The one main lobe of the microphone assembly 1100 is narrow and forwardly directed, being narrower than the bi-directional microphone assembly 208 forward lobe, and having better off-axis noise cancellation.

Figure 13:
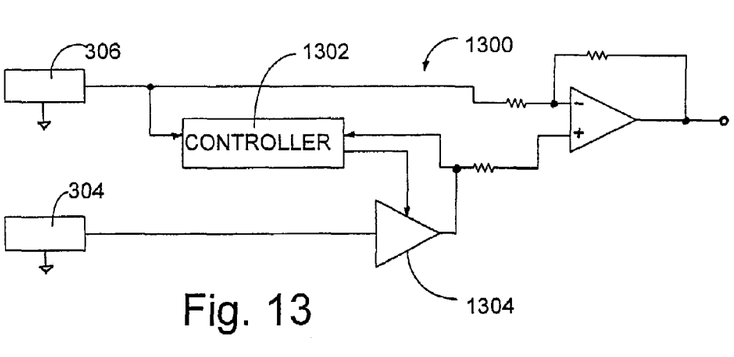
FIG. 13 is a circuit schematic partially in block diagram form illustrating an auto-calibration circuit for use with the microphone assembly.

An automatic balancing circuit 1300 (FIG. 13) can be used in place of, or in addition to, the manual balancing potentiometer R8. Automatic balancing circuit includes a controller 1302 coupled to receive the output of transducer 304 and variable gain amplifier 1304. The controller generates a gain control signal applied to a variable gain amplifier 1304.

Figure 14:
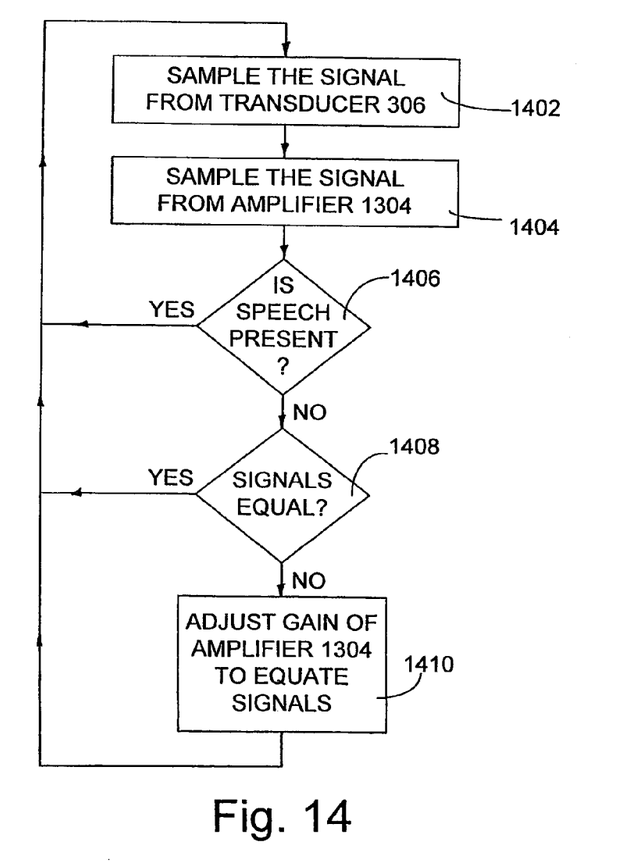
FIG. 14 is a flow chart representing operation of the controller of FIG. 12.

In operation, the controller monitors the signal levels output by the transducer 304 and the variable gain amplifier 1304, as indicated in blocks 1402 and 1404 of FIG. 14. The controller monitors for the presence of speech in step 1406. If speech is present, the controller does not adjust the gain of the variable gain amplifier 1304. If speech is not present, the controller determines whether the output of the variable gain amplifier 1304 is equal to the output of transducer 304, in step 1408. If it is not equal, the gain of variable gain amplifier 1304 is adjusted in proportion to the difference between the signal level at the output of transducer 304 and the signal level at the output of amplifier 1304, as indicated in step 1410. The output of the variable gain control will thus be equal to the signal level at the output of transduce 306, thereby providing noise cancellation. Variation in the relative performance of the transducers 304, 306 over time or temperature can thus be compensated automatically by the automatic gain control circuit 1300.

The microphone assemblies 1000 and 1100 can be manufactured in the same manner as the microphone assembly 208, but with different spatial relations for the transducers.

Figure 15:
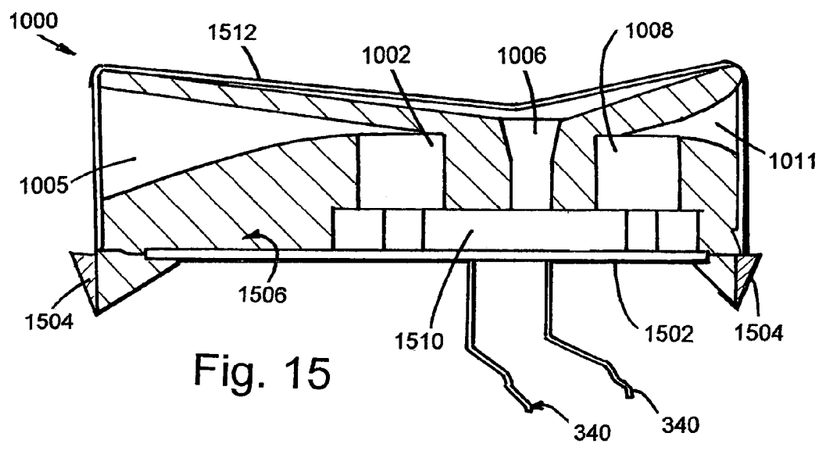
FIG. 15 is a cross-sectional view of the microphone according to FIG. 10 taken along the longitudinal axis of the microphone.

For example, whereas the transducers 304 and 306 of microphone assembly 208 are positioned laterally an equal distance from the front and back ports 312, 314, the transducers 1002 and 1008 are positioned one behind the other between the front and back ports 1004, 1010, and may for example be positioned along the longitudinal axis of the microphone assembly 1000, through which the cross section of FIG. 15 is taken. In particular, the microphone assembly 1000 includes an elastomeric transducer mount 1506 into which transducers 1002, 1008 are mounted. The front of transducer 1002 ports through channel 1005 and the rear of transducer 1008 ports through chamber 1510 and channel 1006. The front face of rear transducer 1008 ports through channel 1011 and the rear surface ports through chamber 1510 and channel 1006. A substantially rigid microphone housing 1512 encloses the transducer mount 1506, and includes mechanical connectors 1504 for connection to the mirror housing 206, as well as bottom, front and rear ports for sound to enter the microphone for passage to the transducers. The connectors 1504 can be snap connectors or connectors that rotate into engagement with the mirror housing in the same manner as connectors 320. The transducer mount 1506 provides acoustic seal with the transducers 1002, 1008, and the circuit board 1502.

Thus it can be seen that an improved microphone for vehicles is disclosed. It is envisioned that the microphone assembly may be applied to a wide variety of performance applications, in that the microphone assembly can include a single transducer or multiple transducers. By using multiple transducers, significantly improved performance is achieved. Use of one transducer, having a single diaghram or multiple diaghrams suitably ported to achieve a desired directional pattern, offers a lower cost microphone that can be used in the same mount and housing as the multiple transducer microphone, in applications where the higher performance is not required.

While the invention has been described in detail herein in accordance with certain embodiments thereof, many modifications and changes may be effected by those skilled in the art without departing from the spirit of the invention. Accordingly, it is our intent to be limited only by the scope of the appending claims and not by way of details and instrumentalities describing the embodiments shown herein.

We claim:

1. A vehicle accessory, comprising:
    a housing;
    at least one first transducer positioned in said housing;
    at least one second transducer positioned in said housing, wherein the first and second transducers are positioned in spaced relation; and
    a circuit coupled to the first and second transducers for combining the output signal of the first and second transducers to produce a signal with a reduced noise component, wherein the circuit subtracts the signal from the at least one first transducer from the signal from the at least one second transducer,
    wherein the at least one first transducer has a front face ported to the front of the housing and the at least one second transducer has a front face ported to the rear of the housing, the at least one first transducer is closer to front ports provided in the housing than the at least one second transducer, the rear of the at least one second transducer is ported to the front of the housing, the at least one first and second transducers are substantially the same, and a distance between the at least one first transducer and front housing ports provided in the housing is substantially equal to a distance between the at least one second transducer and rear housing ports provided in the housing.

2. A vehicle accessory, comprising:
    a housing;
    at least one first transducer positioned in said housing;
    at least one second transducer positioned in said housing, wherein the first and second transducers are positioned in spaced relation; and
    a circuit coupled to the first and second transducers for combining the output signal of the first and second transducers to produce a signal with a reduced noise component, wherein the at least one first transducer is closer to front ports provided in the housing than the at least one second transducer,
    wherein the second transducer is spaced from the first transducer by a distance approximately equal to the distance between the first transducer and the front ports.

3. The vehicle accessory as defined in claim 2, wherein the at least one first transducer has a front face ported to the front of the housing and the at least one second transducer has a front face ported to the rear of the housing.

4. The vehicle accessory as defined in claim 3, wherein the circuit subtracts the signal from the at least one first transducer from the signal from the at least one second transducer.

5. The vehicle accessory as defined in claim 4, wherein the rear of the at least one first transducer it ported to the rear of the housing.

6. The vehicle accessory as defined in claim 5, wherein the rear of the at least one second transducer is ported to the front of the housing.

7. The vehicle accessory as defined in claim 5, wherein the at least one first and second transducers are substantially the same.

8. The vehicle accessory as defined in claim 2, wherein the circuit includes a delay for adding to the output of the at least one second transducer a delay equal to the time required for sound to travel the distance between the first and second transducers.

9. The vehicle accessory as defined in claim 2, wherein the housing includes a microphone housing and a mirror housing, and wherein the at least one first transducer and the at least one second transducer are mounted within the microphone housing.

10. A vehicle accessory, comprising:
    a housing including a microphone housing and a mirror housing;
    at least one first transducer positioned in the microphone housing;
    at least one second transducer positioned in the microphone housing, wherein the first and second transducers are positioned in spaced relation;
    a transducer mount positioned within the microphone housing, the at least one first transducer and the at least one second transducer positioned within the transducer mount, and the transducer mount including channels for porting the transducers; and
    a circuit coupled to the first and second transducers for combining the output signal of the first and second transducers to produce a signal with a reduced noise component,
    wherein the circuit is mounted on a circuit board positioned within the microphone housing.

11. The vehicle accessory as defined in claim 10, wherein the at least one first transducer and the at least one second transducer are mounted to the circuit board, and the transducer mount is positioned between the circuit board and the microphone housing, wherein a chamber is located behind the transducers to provide a sound channel for porting the rear of the transducers.

12. A rearview mirror assembly, comprising:

a rearview mirror housing;

a mirror positioned in the rearview mirror housing;

a microphone housing mounted on the rearview mirror housing;

first and second transducers positioned in the microphone housing, said transducers including front surfaces aimed in opposite directions from one another and towards a respective side of said rearview mirror housing such that, when experiencing mechanical vibration, said transducers output electrical signals having a vibrational noise component corresponding to the mechanical vibration that are out of phase with one another; and a circuit coupled to said transducers for receiving the outputs therefrom for combining the electrical signals from said transducers such that the vibrational noise components cancel one another.

13. The rearview mirror assembly of claim 12, wherein the front surfaces of said first and second transducers face one another.

14. A rearview mirror assembly, comprising:

a rearview mirror housing;

a mirror positioned in the rearview mirror housing;

a microphone housing mounted on the rearview mirror housing;

first and second transducers positioned in the microphone housing, said transducers including front surfaces aimed in opposite directions from one another such that, when experiencing mechanical vibration, said transducers output electrical signals having a vibrational noise component corresponding to the mechanical vibration that are out of phase with one another; and a circuit coupled to said transducers for receiving the outputs therefrom for combining the electrical signals from said transducers such that the vibrational noise components cancel one another.

15. The rearview mirror assembly of claim 14, wherein the front surfaces of said first and second transducers face one another.

* * * * *